March 5, 1946.  H. C. MORGAN  2,396,112
RADIO NAVIGATION SYSTEM AND METHOD
Filed Sept. 2, 1943  4 Sheets-Sheet 2
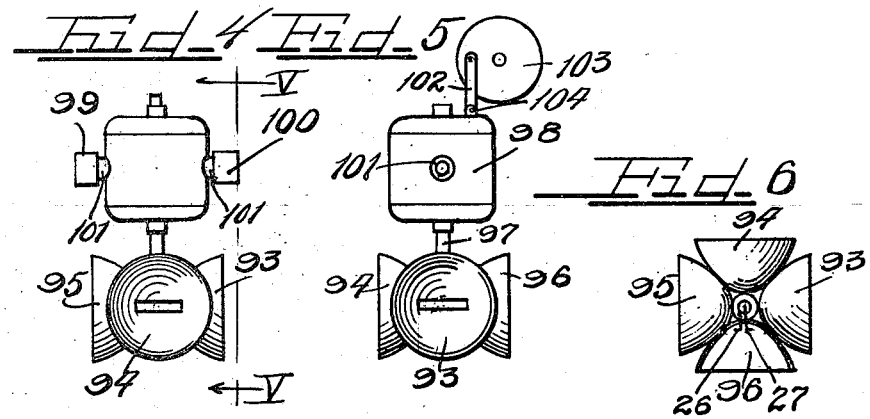
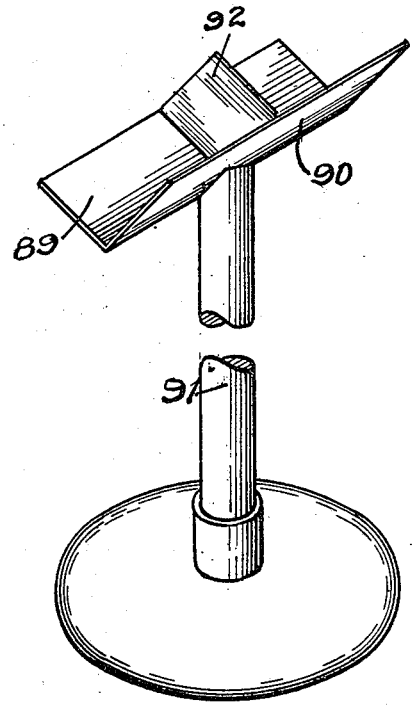
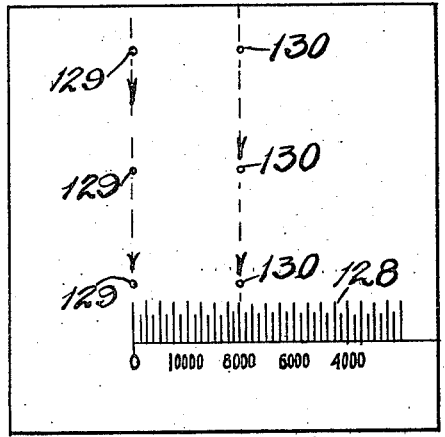
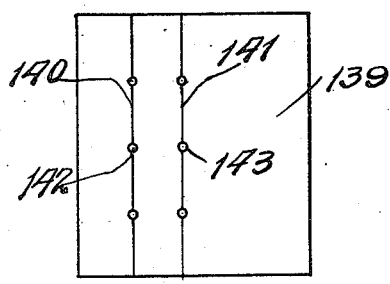
Inventor
Harry C. Morgan
by Charles Ally
Attys.

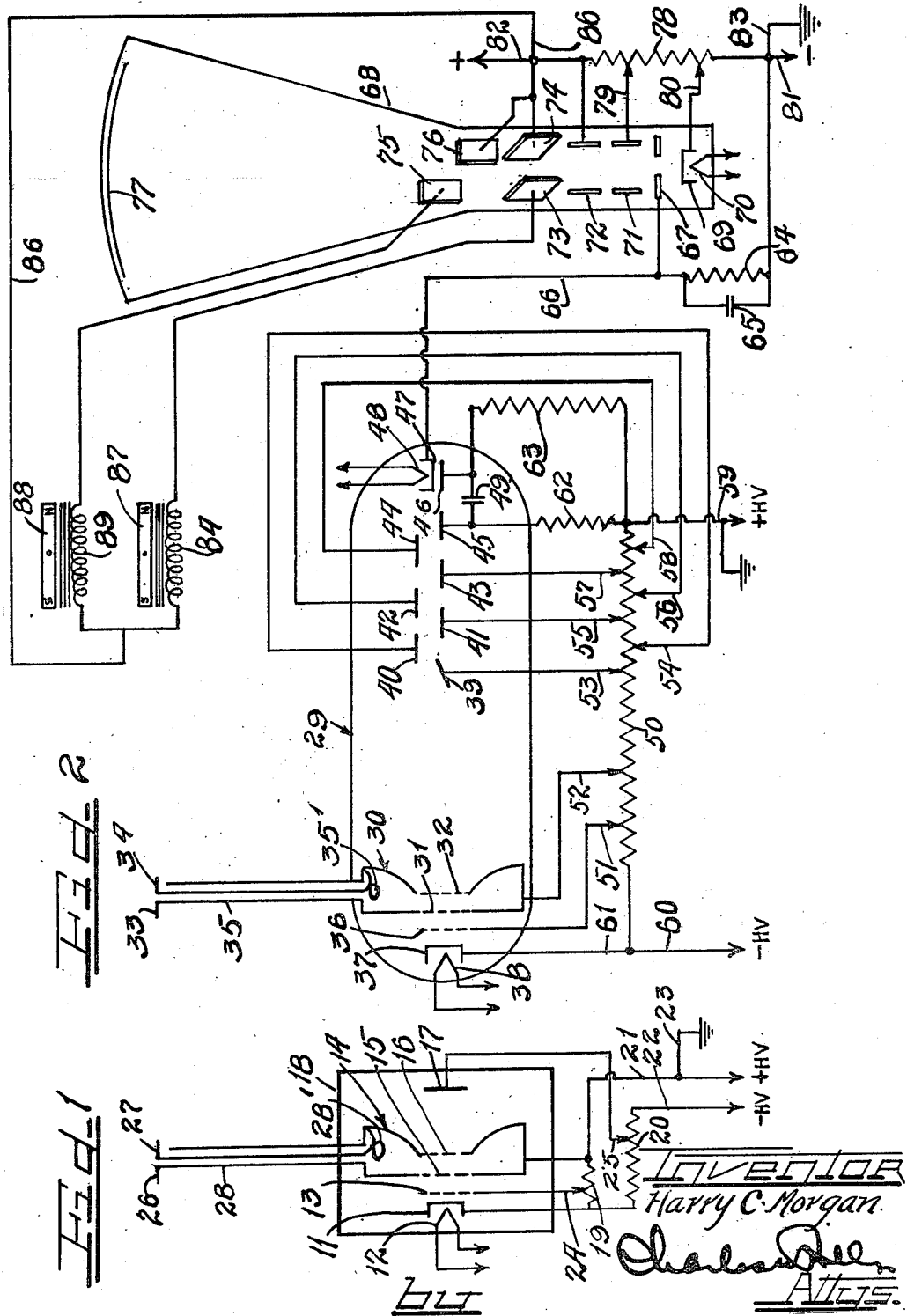

March 5, 1946.    H. C. MORGAN    2,396,112
RADIO NAVIGATION SYSTEM AND METHOD
Filed Sept. 2, 1943    4 Sheets-Sheet 3
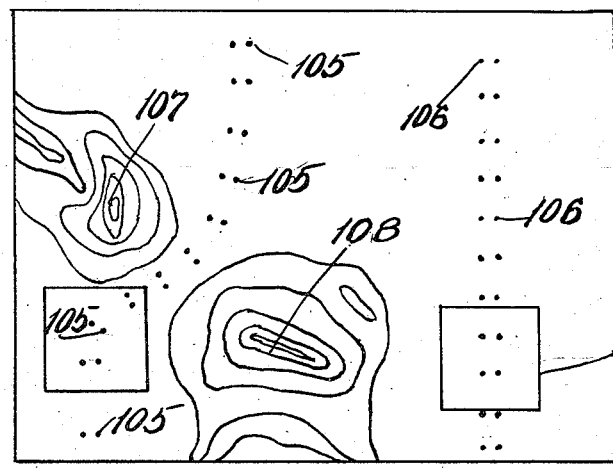
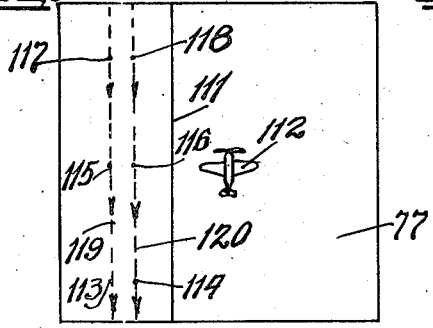
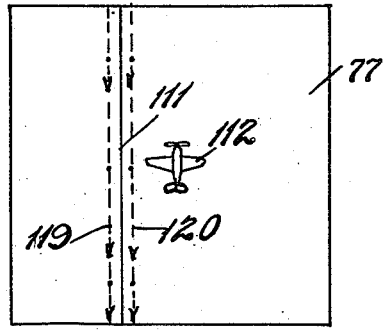
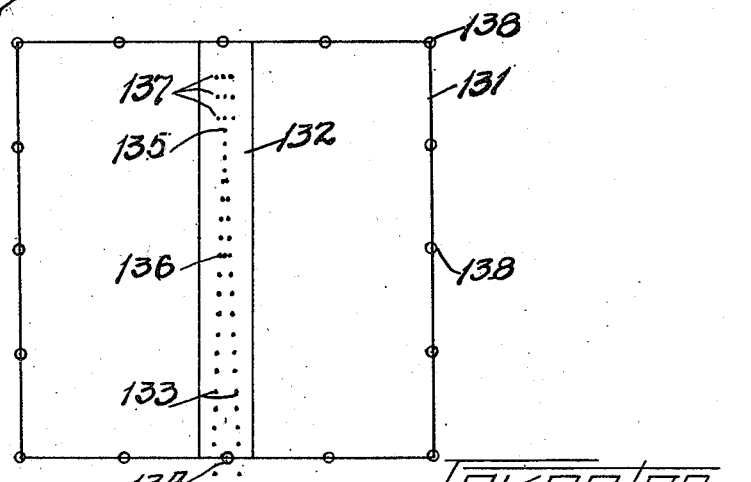
Inventor
Harry C. Morgan.
by Charles Sill
Attys.

March 5, 1946.   H. C. MORGAN   2,396,112
RADIO NAVIGATION SYSTEM AND METHOD
Filed Sept. 2, 1943    4 Sheets-Sheet 4

Inventor
Harry C. Morgan.
by Charles Hill
Atty.

Patented Mar. 5, 1946

2,396,112

UNITED STATES PATENT OFFICE 2,396,112

RADIO NAVIGATION SYSTEM AND METHOD

Harry C. Morgan, Dayton, Ohio, assignor, by mesne assignments, to Curtis Engineering Company, Inglewood, Calif., a copartnership consisting of William H. Curtis and Russell R. Curtis Application September 2, 1943, Serial No. 500,891

14 Claims. (Cl. 250—11)

This invention relates to a radio navigation system and method and more particularly to a system for scanning an area with a high frequency radio beam, causing said beam to be reflected from a special type reflector, and means for receiving and indicating the range and position of the reflectors.

Considerable work has been done in the past on developing a radio range and bearing determining device. This work has been confined for the most part to projecting an ultra high-frequency radio beam and then detecting the presence of scattered radiation resulting from the interception of the beam by an object. The system of the present invention differs fundamentally from this past type in that the receiver which is mounted close to the transmitter is of relatively low gain and is arranged to receive only radiations which are returned by a reflector having high efficiency of reflection. This reflector is of a type which will cause a high-frequency radio beam to be reflected along a path parallel to but slightly displaced from their incident path irrespective of the angle at which the incident beam strikes the reflector. A reflector of this character may be formed by arranging three metal surfaces disposed at right angles to each other, thus forming the corner of a cube. Such a reflector will hereinafter be referred to as a "retro-reflector."

One of the principal features and objects of the present invention is to define an air course by locating a plurality of the aforesaid reflectors along the ground to define the air course path. The airplane is then provided with a high-frequency radio beam transmitter for scanning the ground below it and ahead of it, and the location of the plane with respect to the desired course is indicated visually on a fluorescent screen. It will thus be apparent that a further feature and object of the present invention is to provide a radio navigation system and method wherein not only the position of a plane with respect to its course at the moment is indicated but the course ahead of the actual airplane's position is indicated in advance.

Another object of the present invention is to provide an absolute course and altimeter instrument.

A further object of the present invention is to provide a novel blind landing device and system.

A still further object of the present invention is to provide an absolute ground speed indicator.

Another and further object of the present invention is to provide a novel means for landing a plane blind, the only equipment located outside of the airplane being a group of special reflectors located on the landing field.

Still another and further object of the present invention is to provide a novel means for indicating the heading and direction of absolute motion of an airplane with respect to the desired course.

The novel features which I believe to be characteristic of my invention are set forth with particularity in the appended claims. My invention itself, however, both as to its manner of construction and method of operation, together with further objects and advantages, may best be understood by reference to the following description, taken in connection with the accompanying drawings, in which:

Figure 1 is a schematic wiring diagram of an ultra high-frequency radio transmitter employed in one embodiment of the present invention;

Figure 2 is an ultra high-frequency radio receiver and cathode ray indicating tube;

Figure 3 is a view of a special type of reflector to be employed in the present system and which will hereinafter be referred to as a retro-reflector;

Figure 4 is a diagrammatic plan view of a high speed motor with four reflectors mounted for rotation thereon;

Figure 5 is a side view partly in section of the motor and reflector unit shown in Figure 4 as taken along the lines V—V thereof;

Figure 6 is an end view of the unit shown in Figure 4;

Figure 7 is a diagrammatic illustration of a terrain equipped with a plurality of pairs of retro-reflectors to define air courses;

Figure 8 is a view of the fluorescent screen of the cathode ray tube of Figure 2 showing the plane as being "off course";

Figure 9 is a view similar to Figure 8 but showing the plane "on course";

Figure 16 is a diagrammatic illustration of a scale marked on a cathode ray tube for indicating the altitude of an airplane above a pair of retro-reflectors located directly therebeneath;

Figure 17 is a diagrammatic illustration showing the position of a group of retro-reflectors located on an airplane landing field for enabling a pilot to land blind with no other equipment located on the ground other than the retro-reflectors; and Figure 18 is a diagrammatic illustration of a cathode ray tube screen for use in blind landing.

Figure 10:
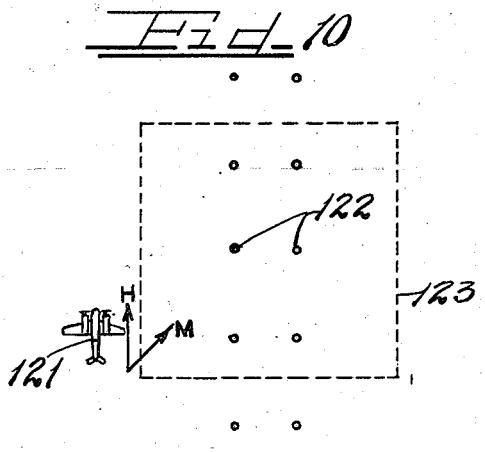
Figure 10 is a diagrammatic illustration showing an airplane whose heading is parallel to the course but whose direction of motion is obliquely across the course.

In order to carry out the teachings of the present invention an ultra high-frequency radio transmitter is mounted on an airplane or other vehicle. In the embodiment shown in Figure 1, the ultra high-frequency radio transmitter is in the form of a Klystron oscillator. The diagrammatic representation of the Klystron oscillator includes an electron emitting cathode 11 which is indirectly heated by a filament 12. Adjacent the cathode 11 is an accelerating and focusing grid 13. This accelerating and focusing grid 13 draws out a stream of electrons from the cathode 11 and causes the same to be projected through a cavity resonator 14 having a pair of closely spaced grids 15 and 16. A plate electrode 17 is arranged in the opposite end of the evacuated envelope 18 to repel the stream of electrons which arrives in that vicinity and return them to the cavity resonator 14.

A voltage divider having two resistance elements 19 and 20 is connected across a pair of supply lines 21 and 22 which are connected respectively to the high and low sides of a source of high voltage uni-directional electric energy. The high voltage conductor 21 is grounded as at 23. It will thus be apparent that the cathode 11 is maintained as a high negative potential with respect to the grids 15 and 16 of the cavity resonator 14. The accelerating and focusing anode 13 is connected to the voltage divider element 19 by means of a movable contact 24, while the plate electrode 17 is connected to the voltage divider element 20 by means of a movable contact 25. It will thus be apparent that the collector plate 17 is at a negative potential with respect to the cathode 11 as well as to the other elements of the tube 18.

The circuit arrangement of the Klystron oscillator hereinbefore described is such as to provide a reflex Klystron oscillator in which a single resonator acts both as the electron buncher and the electron catcher. After the electrons pass through the cavity resonator 14, their direction of motion is reversed by means of the negative bias on plate 17. By proper adjustment of the voltages the electrons can be made to pass through the resonator again at the proper time so that energy is delivered to the resonator.

A half-wave dipole antenna having radiating elements 26 and 27 is connected through a concentric tube transmission line 28 to an inductive coupling loop 28' inside the cavity resonator 14. The half-wave dipole antenna 26, 27 is arranged to propagate an ultra-high-frequency radio wave having a wave length of the order of magnitude of only a few centimeters.

The manner in which this propagated high-frequency wave is concentrated in a beam and the manner in which the beam is directed to scan the ground below the airplane on which the transmitter is mounted will presently be described.

In Figure 2 of the drawings there is illustrated a microwave receiver and a cathode ray tube indicating device for use in conjunction with the transmitter described in connection with Figure 1. More particularly, the microwave receiver comprises an electron discharge device or radio tube 29 having a cavity resonator 30 mounted near the left-hand end thereof. This cavity resonator includes two closely spaced grid elements 31 and 32. A half-wave dipole antenna which includes antenna elements 33 and 34, conducts the high-frequency energy to the resonator through a concentric tube transmission line 35. A coupling loop 35' from the transmission line inductively couples the transmission line to the cavity resonator.

To the left of the cavity resonator is an accelerating and focusing grid 36, a cathode 37 and a heating filament 38.

Toward the right-hand end of the tube 29 a plurality of electrodes 39, 40, 41, 42, 43, and 44 having surfaces of low work function are provided to form a secondary emission amplifier. By positioning properly the electrodes 39 to 44 the electron stream successively impinges on the electrodes 39, 40, 41, 42, 43 and 44 in that order. For every electron striking the electrode 39 a number of electrons are released and drawn to the electrode 40. Thus the number of electrons striking the electrode 40 is greater than the number of electrons striking the electrode 39. Similarly, for every electron which strikes electrode 40 a number of electrons are released and are drawn to the electrode 41 which has a higher positive potential bias than that of electrode 40. The number of electrons reaching electrode 41 is thus greater than the number of electrons reaching electrode 40. The number of electrons forming the electron stream is thus greatly multiplied due to their successive impingement on the electrodes 39 to 44 inclusive. Near the last electrode 44 of the electron multiplier is a collector 45 which collects the electrons forming the stream emitted by the cathode 37 and multiplied by the electrodes 39 to 44.

In the extreme right-hand portion of the tube 29 is a diode including an anode or plate 46, a cathode 47 and a heating filament 48. The electron multiplier or secondary emission amplifier portion of the tube 29 is connected to the diode through a coupling condenser 49 which is also contained within the evacuated tube 29. This coupling condenser 49 extends between the diode plate 46 and the collector plate 45 of the secondary emission amplifier.

The energization circuit for the tube 29 includes a voltage divider element 50 having a plurality of movable contacts 51, 52, 53, 54, 55, 56, 57 and 58 in engagement therewith. The right-hand end of the voltage divider element 50 is connected to a source of high voltage unidirectional electric energy as indicated by the conductor 59 which is also grounded as shown. The left-hand end of the voltage divider element and the low voltage end of the source of power is connected to the circuit through a conductor 60. This low voltage end of the voltage divider element 50 is also connected to the cathode 37 through a conductor 61.

The high voltage end of the voltage divider element 50 is connected through a load resistor 62 to the collector plate 45 of the tube 29. The high voltage end of the voltage divider element 50 is also connected through a second load resistor 63 to the plate 46 of the diode portion of the tube 29. The output of the tube 29 is connected through a conductor 66 to the control grid 67 of the cathode ray tube 68.

The cathode ray tube 68 is of conventional design and in addition to the control grid 67 includes a cathode 69, a heating filament 70, a focusing anode 71, an accelerating anode 72, a pair of horizontal deflector plates 73 and 74, a pair of vertical deflector plates 75 and 76, and a fluorescent screen 77. Deflecting plates 74 and 76 are directly connected to the high potential side of a voltage divider resistor 78 as well as to the accelerating anode 72. The focusing anode 71 is connected through a movable contact 79 to the voltage divider element 78. The cathode 69 is connected through a movable contact 80 to the voltage divider element 78. The lower end of the voltage divider element 78 is connected to the negative side of the direct current source through a conductor 81 while the upper end of voltage divider element 78 is connected to the high potential side of a direct current source through a conductor 82. The negative potential side is preferably grounded as at 83 so that in effect the upper end of the voltage divider element 78 has a high positive potential. The control grid 67 is connected through a resistor 64 to the negative end of the voltage divider element 78. A filter condenser 65 is connected across resistor 64.

The deflecting plate 73 is connected through a stator or field winding 84 to the positive side of the voltage divider 78 through conductor 86, while deflector plate 75 is connected through a stator or field winding 85 to the same potential point through the conductor 86. An alternating voltage is induced in the stator winding 84 of the deflector plate 73 by means of a rotating armature 87. In this case the rotating armature 87 has been diagrammatically illustrated as a bipolar permanent magnet. An electrically excited armature may of course be provided if desired. A similar armature 88 is associated with the stator 89 and is arranged to induce an alternating potential in the stator winding 89 for the deflector plate 75. The manner in which the armatures 87 and 88 are rotated and the elements with which they are synchronized will presently be described. At the present moment it will be sufficient to understand that the rotating armatures 87 and 88 cause the electron stream drawn out from the cathode 69 of the cathode ray tube 68 to rapidly scan the fluorescent screen 77.

The operation of the circuit shown in Figure 2 will now be described.

Due to the potentials applied to the various electrodes within the tube 29, a stream of electrons is drawn out from the cathode 37 by the accelerating and focusing grid 36. Electrons passing through the cavity resonator 30 are modulated by the ultra high-frequency wave picked up by the half-wave dipole antenna 33, 34 and transmitted to the grids 31 and 32 of the cavity resonator 30 by means of the coupling loop 35'. This modulation takes the form of slightly speeding up or slowing down the electrons as they pass through the resonator. The transit time in the field-free path permits a bunching to take place as the electrons which are slowing down are met by the electrons which have been speeded up. We thus see that first a velocity modulation of electrons takes place as the electrons pass through the cavity resonator 30 and this is followed up by conversion into density modulation in the field-free space which follows. This density modulated stream of electrons is then amplified in the secondary emission amplifier portion of the microwave receiver 29 so that the total number of electrons reaching the collector plate 45 in a given unit of time is greatly in excess of the total number of electrons leaving the cathode 37 in the same unit of time.

If the electron stream passing through the cavity resonator 30 were not modulated (that is, if no high-frequency wave were being picked up by the antenna 33, 34) a steady direct current would flow through the resistor 62 which gives the collector plate 45 a negative voltage with respect to the positive end of he voltage divider 50. The isolating condenser 49 prevents D. C. voltage from being applied to the plate 46 of the diode detector portion of the tube 29.

When alternating high-frequency voltages of an extremely high order (such for example as high frequency voltages having a wave length of a few centimeters) are applied to the resonator 30, the current in the load resistor 62 has an alternating component which is applied across the load resistor 63 and the plate and cathode 46 and 47 of the diode portion of the tube 29. Since a thermionic diode will only pass current in one direction, the negative halves of the alternating current in this instance are not passed. This results in half-wave rectification. The rectified half-waves may be smoothed out by an appropriate filter circuit (not shown) if desired. This voltage resulting from the half-wave rectification is then applied to the control grid 67 of the cathode ray tube 68 through a conductor 66 which extends between the cathode 47 and the control grid 67. The potential biases on the various elements of this circuit are so arranged that the control grid 67 prevents the flow of electrons in the cathode ray tube 68 except when ultra high-frequency radio energy is being picked up by the half-wave dipole 33, 34. At such times the high negative bias of the control grid 67 is reduced to a point where a stream of electrons is drawn out from the cathode 69 and caused to impinge on the fluorescent screen 77.

If the ultra high-frequency radio beam propagated by the transmitter 18 is caused to systematically scan the ground below and in front of an airplane on which the transmitter is mounted and if the scanning of the ground is synchronized with the scanning of the fluorescent screen 77 in the cathode ray tube 68 it will be understood that a spot will appear on the fluorescent screen at each and every point corresponding to points on the ground which are provided with retro-reflectors or other special means for causing the propagated high-frequency radio beam to be reflected with relatively high efficiency along a path parallel to the incident path of the propagated beam. The gain in the microwave receiver 29 is preferably kept sufficiently low so that only an ultra high-frequency radio beam which is reflected with a high degree of efficiency will be detected in the receiver 29.

The particular device for reflecting the ultra high-frequency radio beam is illustrated in Figure 3 of the drawings and includes a pair of metal plates 89 and 90 mounted at right angles to each other on a pedestal 91. A third metal plate 92 is mounted in a plane at right angles to both plates 89 and 90. The intersection of the three plates 89, 90 and 92 thus forms a corner of a cube on either side of the plate 92. Such a construction has the property of reflecting a beam of radio waves parallel to their incident path, but displaced therefrom, irrespective of the angle at which the beam strikes any one of the three plates 89, 90 and 92. If the propagated radio beam should lie in a path parallel to the plane of plate 92 the beam would strike first one of the plates 89 and 90, then be reflected to the other plate and then back on a path parallel to but displaced from its incident path. If the beam of radio waves should lie in a path at an angle to all three plates 89, 90 and 92 the beam might strike, for example, plate 90 first, then be reflected to plate 92, then be reflected to plate 89 and finally be reflected along a path parallel to but displaced from its original propagated path.

It is believed that a radio wave incident upon a metal surface, by virtue of its electro-magnetic nature, induces an oscillating electric current in the electron gas in the surface of the metal. This oscillation has the same period as the incident radio wave, and absorbs the energy of the wave. This leaves an oscillating current which becomes a new source of radio waves. If the metal were a rod or a wire, the newly radiated energy would spread out in all directions. If, however, the metal is a flat plate, other oscillations are set up in the metal adjacent to the current under consideration. These currents also radiate radio energy, and constrain the radio waves to be radiated in straight lines by the laws of optical reflection. The term retro-reflection is employed to define that type of reflection where a beam of radio waves is reflected along a path parallel to its incident path but displaced therefrom. It is possible to show by mathematical methods that retro-reflection occurs from the corner of a cube but for purposes of simplicity this mathematical proof is not presented herein.

Figures 4, 5 and 6 of the drawings are diagrammatic illustrations of the means for causing the ultra high-frequency radio beam to scan the ground below and before the airplane. The scanning speed must be high enough to give good detail and still not be too high because the speed of light shifts the position of the distant objects too much. The scanning and framing mechanisms illustrated in the preferred embodiment of the present invention are mechanical and hence the speed must be low enough to prevent mechanical difficulty. By way of example and not by way of limitation, a compromised speed may be employed of 8 frames per second and 100 lines per frame.

If four parabolic reflectors 93, 94, 95 and 96 are mounted around a forward axle 97 driven by an electric motor 98, the speed of rotation of the shaft 97 need only be a quarter of the total number of lines per second. The motor 98 is mounted in side bearings 99 and 100 on stud shafts 101. A crank arm 102 eccentrically mounted on a rotating disk 103 and pivotally connected to the motor 98 as at 104 causes the plane of rotation of the parabolic reflectors 93 to 96 to rock back and forth about the side axis 101 approximately 120°. If, by way of example, the speed of rotation of the motor shaft 97 is 12,000 R. P. M. and the speed of rotation of the disk 103 is 480 R. P. M. then the desired 8 frames per second and 100 lines per frame will be obtained by the scanning mechanism. The antenna elements 26 and 27 of the half-wave dipole of the transmitter 18 are disposed as shown in Figure 6 so that the various parabolic reflectors 93, 94, 95 and 96 are successively brought into a position where the half-wave dipole elements 26 and 27 are approximately at the focal point of the parabolic reflectors. This is accomplished by providing an elongated narrow slot in the back of each reflector 93 to 96 through which the antenna elements 26 and 27 extend as these reflectors 93 to 96 are successively moved into position by rotation of the shaft 97. The antenna elements 26 and 27 are maintained in fixed position while the reflectors 93 to 96 rotate with shaft 97.

The beam propagating and scanning mechanism diagrammatically represented in Figures 4, 5 and 6 is mounted in such a manner on the airplane that the shaft 97 is disposed approximately longitudinally of the plane and in a horizontal position when the plane is level. The stud shafts 101 are disposed transversely of the plane and in a generally horizontal position. The rotor or armature 87 previously described in connection with Figure 2 of the drawings is arranged to be driven by the motor 98 to synchronize the biasing potential on the horizontal deflecting plates 73 and 74 with the scanning movement of the transmitter effected by the rotation of the parabolic reflectors 93 to 96 by the motor shaft 97. The rotor or armature 88 of Figure 2 is arranged to be driven by the rotating disk 103 so as to synchronize the biasing potential on the vertical deflector plates 75 and 76 with the back and forth motion given the plane of rotation of the parabolic reflectors 93 to 96 by the crank arm 102.

The microwave transmitter, the microwave receiver, the scanning mechanism and the special retro-reflectors have now been described. Reference will now be made to the disposition of the retro-reflectors in order to define an air course which may be followed by the plane. In order to define a straight path or a substantially straight path the retro-reflectors of the type shown in Figure 3 are disposed along the desired path in pairs about five miles apart, for example, and the two retro-reflectors forming each pair being disposed about a thousand feet apart at right angles to the course. In order to protect the retro-reflectors from the weather they may be mounted in or covered with glass or plastic. The pairs of retro-reflectors should, of course, be placed somewhat closer together where a curved path is to be followed. By way of illustration and example there is shown in Figure 7 two air courses, one defined by a series of retro-reflectors 105 and the other course defined by a series of of retro-reflectors 106. The course defined by the retro-reflectors 105 is shown as winding between two mountain 107 and 108 which are shown schematically by a group of contour lines. The blocked off squares 109 and 110 represent, by way of example, the relative size areas scanned by a plane flying in the vicinity of courses 105 and 106 respectively and would represent the portion of the ground area covered by the fluorescent screen on the cathode ray tube 68.

The cathode ray tube seen in the preferred embodiment of the invention is provided with a solid line 111 and the imprint of an airplane 112 thereon (Figures 8 and 9). The spots 113, 114, 115, 116, 117 and 118 which appear on the fluorescent screen 77 are the result of the reflected microwaves produced by the transmitter and scanning mechanism previously described. If the plane bearing the transmitter and the receiver is flying parallel to the course path but too far to the right thereof the spots 113, 115 and 117 will move down along the path defined by the dotted line 119 while the spots 114, 116 and 118 will move down along the dotted line 120. The permanent line 111 on the screen of the cathode ray tube however will be displaced to the right of the two paths of movement 119 and 120 of these spots. This will indicate to the pilot that the plane is off course to the right. When the plane is brought over to a proper position with respect to the course the permanent line 111 will lie midway between the paths of movement 119 and 120 of the spots as shown in Figure 9. In keeping with good navigational practice it is preferable that planes keep to the right side of their respective courses so as to avoid collision with planes coming in the opposite direction along the same course and at the same elevation. For that reason the permanent line 111 is to the left of the plane 112, the plane 112 being an indication on the cathode ray tube of the relative position of the actual plane with respect to the course being followed.

The nature of the visual indication on the screen 77 of the cathode ray tube 68 when the absolute direction of motion of a plane is different from its heading and also when the plane is crossing an airline course will now be described.

Figure 11:
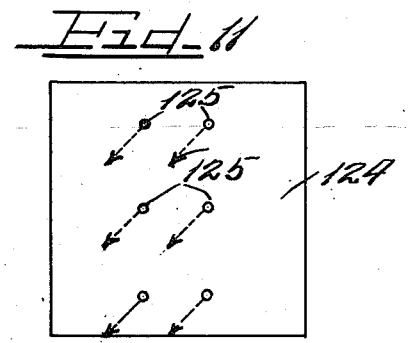
Figure 11 is a diagrammatic illustration indicating the direction of motion of the image spots on the fluorescent screen of the cathode ray tube due to the heading and motion shown in Figure 10.
Figure 12:
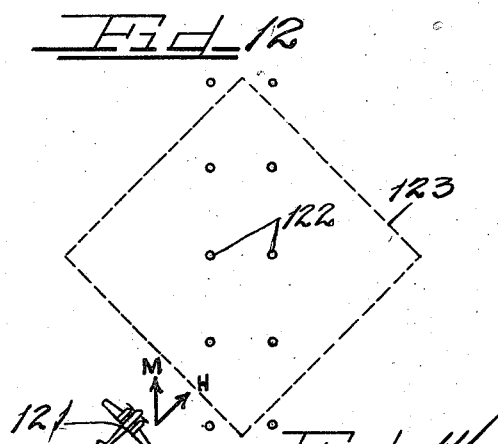
Figure 12 is a diagrammatic illustration similar to Figure 10 but showing the heading of the aircraft as being along a line extending obliquely across the course but whose direction of motion is parallel to the course.
Figure 13:
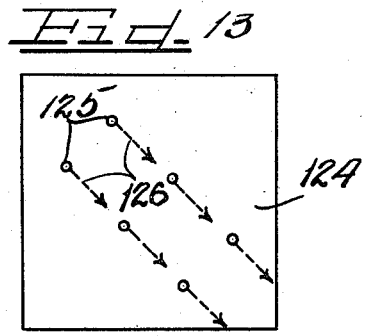
Figure 13 is a diagrammatic illustration of the motion of the image spots on the fluorescent screen of the cathode ray tube due to the heading and direction of motion of the airplane as shown in Figure 12.
Figure 14:
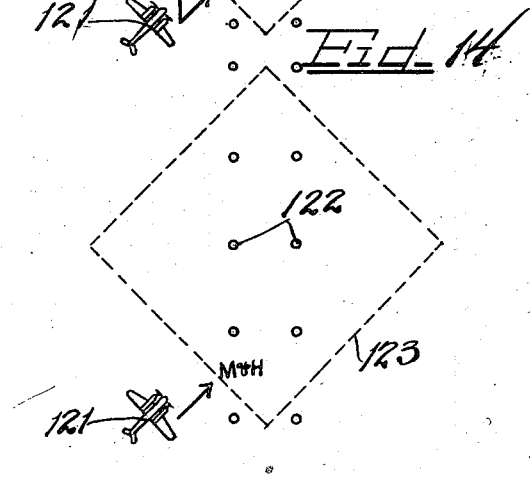
Figure 14 is a diagrammatic illustration of an airplane whose heading and direction of motion is oblique to the direction of the course as indicated by the retro-reflectors on the ground.
Figure 15:
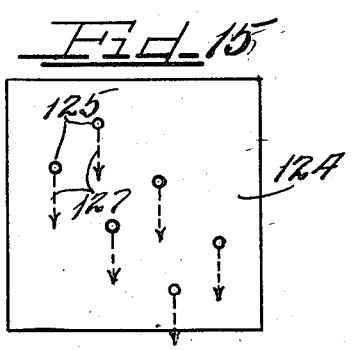
Figure 15 is a diagrammatic illustration of the motion of the image spots on the fluorescent screen of the cathode ray tube due to the heading and motion of an airplane as shown in Figure 14 with respect to its course.

Figures 10, 12 and 14 show different types of movement and heading of an airplane 121 with respect to an airline course defined by a series of retro-reflectors 122 located on the ground. The dotted line 123 in each of these three figures defines the portion of the ground being scanned by the microwave transmitter. Figures 11, 13 and 15 show the screen 124 of a cathode ray tube located on the pilot's panel in the airplane and show the motion of the spots of light 125 across the screen 124 due to the actual heading and motion of the airplane in the view to the left of each of these figures.

More specifically, Figure 10 illustrates an airplane whose heading is parallel to the airplane course defined by the retro-reflectors 122 but whose actual motion is obliquely across the airplane course. The arrow labeled H indicates the heading of the airplane 121 while the arrow labeled M indicates the actual motion or direction of movement of the airplane 121. With this particular heading and this particular motion the light spots 125 on the screen 124 will move obliquely downwardly and to the left across the screen 124 of the cathode ray tube as shown in Figure 11.

In Figure 12 of the drawings the airplane 121 is moving in a path parallel to the airplane course defined by the retro-reflectors 122 as indicated by the arrow M. The heading of the plane, however, is in a direction oblique to the airplane course as indicated by the arrow H. Although the direction of motion of the airplane is proper it will be observed that the orientation of the scanning mechanism is changed due to the heading of the airplane. This results in movement of the light spots 125 obliquely downwardly and to the right across the fluorescent screen 124 as indicated by the arrows 126 in Figure 13.

Figure 14 of the drawings illustrates an airplane whose heading and direction of motion are both obliquely across the airplane course defined by the retro-reflectors 122. This brings about an image in the cathode ray tube screen 124 as shown in Figure 15 of the drawings. The spots of light 125 are lined up along a course obliquely across the screen but the direction of motion of the spots on the screen is directly downwardly as indicated by the arrows 127. In this connection it will be noted that the course will be rapidly crossed by the airplane so that only a few spots such as those shown in Figure 15 will be seen and from then on no spots will be seen. This differs from the situation where the heading and direction of motion are both parallel to the airplane course as shown in Figures 8 and 9 for in that instance the spots move downwardly across the fluorescent screen but the spots are disposed in a line one above the other and a new pair of spots continues to appear at the top of the screen as the lowermost pair of spots disappear at the bottom. We thus see that wherever the absolute motion of the airplane is parallel to the airplane course defined by the retro-reflectors as is the case in Figures 8 and 9 as well as in connection with Figures 12 and 13 a new group of spots continues to appear near the top of the fluorescent screen as the bottommost pair of spots disappear near the bottom of the screen. The direction that the spots move across the screen will, of course, show the heading of the airplane with respect to its direction of motion. It will thus be apparent that the heading of the aircraft may be at once noted from the direction of movement of the spots 125 with respect to the vertical. Furthermore, whenever the motion of the airplane is across the airline course as is the case in Figures 10 and 14, only a relatively few spots will traverse the fluorescent screen of the cathode ray tube. It will thus be apparent to a pilot that his airplane is crossing an airline course rather than following one and it will also be possible for the pilot to determine his heading with respect to his absolute motion.

From the above discussion, it will be apparent that by noting the direction of motion of the spots across the screen with respect to the top or side edge of the screen, and by noting the orientation of the longitudinal axis of the spots with respect to the top or side edge of the screen, both the heading and the actual direction of motion is known.

When the two retro-reflectors forming each pair on the ground are always spaced a uniform distance apart along a course (such, for example, as a thousand feet apart) the absolute altitude of the airplane may readily be determined from the relative distance apart of the two spots on the cathode ray tube screen which corresponds to the retro-reflectors located immediately below the plane. The screen of the cathode ray tube may be provided with a scale 128 as shown in Figure 16 which is directly calibrated in feet to indicate altitude. If the airplane is flown in such a manner that the spots 129 on the left pass through zero, the point on the scale 128 at which the spots 130 on the right cross the scale line will indicate the altitude of the airplane. As indicated by the scale the closer the spots 130 are to the spots 129 the higher the airplane is.

In Figure 17 of the drawings there is illustrated an arrangement by which the aircraft may be landed blind at an airport. More specifically, the airport or landing field is generally indicated by the reference character 131 while one of the runways on the air field is indicated at 132. Built into the surface of the runway 132 are a plurality of retro-reflectors 133 which are closely spaced together and which are positioned to converge from the point 134 to the point 135 along the runway 132. It will be observed that for the greater part of the length of the runway 132 the retro-reflectors 133 are arranged in pairs. However, at the point 136 three retro-reflectors are arranged across the runway in a line in order to provide an indication to the pilot to level off and set the plane down on the runway 132. The end of the runway is defined by a successive series of groups of retro-reflectors 137, each group having three or more retro-reflectors arranged in a line transverse of the runway 132.

The pilot brings his plane over the landing field 131 which is provided with retro-reflectors 138 around the border which defines the edge of the field. The pilot then brings his plane over the landing V about a half mile or so from the field and brings his plane down to such an altitude that the image spots 142 and 143 in Figure 18 caused by the reflectors of each pair fall on guide lines 141 and 142 formed on or over the cathode ray tube screen. If, as he comes towards the field, the image spots forming a pair, are closer together than the spacing between the guide lines 141 and 142, the plane must drop lower to bring the image spots back into the guide lines. If the pilot is flying his plane below the desired glide path, the image spots will be further apart than the spacing of the guide lines 141 and 142, and the pilot must gain altitude in order to bring his plane back onto the desired glide path. If the pilot is off course (i. e., to the right or left of the desired glide path) the spots as such will shift bodily to the left or right of the guide lines 141 and 142. It will thus be apparent that with a single radio transmitter and receiver a complete blind landing operation may be carried out, for the pilot is given both vertical as well as horizontal guidance. When three spots appear on the screen as would occur at the point 136 along the landing field 131, the pilot knows that he is at a predetermined distance off the ground and that it is time to level off his plane and set the plane down on the runway. The groups of retro-reflectors 137 are in the nature of safety indicators in case the pilot has not set his plane down by that time. This would give him a warning that he is near the end of the runway 132.

From the above description it will readily be apparent that the aerial navigation system and method which I have described not only provides means for enabling a pilot to follow a desired course, which may wind about if necessary to avoid obstructions along the terrain, but it also provides a complete blind landing system for an aircraft by providing both vertical and horizontal guidance for the aircraft. It will furthermore be apparent that this system eliminates the necessity of defining a navigation course by a plurality of intersecting or contiguous straight lines (as is the case of the conventional radio beacon system in common usage today).

By providing receivers of relatively low gain only reflections from retro-reflectors or similar high efficiency reflectors will be picked up, and for that reason the confusion caused by detecting reflected radiation from miscellaneous objects (scattered radiation) is eliminated.

While I have shown and described certain particular embodiments of my invention, it will, of course, be understood that I do not wish to be limited thereto, since many modifications may be made, and I, therefore, contemplate by the appended claims to cover all such modifications as fall within the true spirit and scope of my invention.

I claim as follows:

1. The method of aerial navigation which enables a pilot to cause his aircraft to follow a desired course which includes defining the course on the ground with a series of relatively high efficiency reflectors laid out in a regular pattern, propagating a beam from the aircraft, causing the beam to systematically scan the ground below the aircraft, and indicating the relative position of any reflected portions of the beam, the reflected portions of the beam giving an indication of course and altitude.

2. The method of indicating the absolute altitude of an aircraft which includes causing an ultra high-frequency radio beam propagated from an aircraft to be reflected from two known points on the ground located a predetermined distance apart, and indicating the relative spacing of the two reflected beams as received on the aircraft, thereby to indicate the absolute altitude of the aircraft.

3. An aerial navigation system for enabling a pilot to fly an aircraft over a predetermined course comprising means on the aircraft for propagating a narrow ultra high-frequency radio beam, means for causing the beam to systematically and repeatedly scan the ground below the aircraft, reflecting means on the ground laid out in a regular pattern along the predetermined course for reflecting said beam to the aircraft when it falls thereupon, and means on the aircraft for indicating its course and altitude by the relative location of the reflecting means when a reflection occurs.

4. An aerial navigation system for enabling a pilot to fly an aircraft over a predetermined course comprising means on the aircraft for propagating a narrow ultra high-frequency radio beam, means for causing the beam to systematically and repeatedly scan the ground below the aircraft, reflecting means substantially uniformly located on the ground along the predetermined course for reflecting said beam to the aircraft when it falls thereupon, and means on the aircraft for indicating the course and altitude of the aircraft by the relative location of the reflecting means when a reflection occurs.

5. An aerial navigation system for enabling a pilot to fly an aircraft over a predetermined course comprising means on the aircraft for propagating a narrow ultra high-frequency radio beam, means for causing the beam to systematically and repeatedly scan the ground below the aircraft, reflecting members arranged in pairs on the ground along the predetermined course for reflecting said beam to the aircraft when it falls thereupon, the members of each pair being disposed so that an imaginary line connecting the members of each pair lies substantially at right angles to the desired course of flight, and means on the aircraft for indicating the relative location of the reflecting means when a reflection occurs, the course and altitude of the aircraft being indicated thereby.

6. An aerial navigation system for enabling a pilot to fly an aircraft over a predetermined course comprising means on the aircraft for propagating a narrow ultra high-frequency radio beam, means for causing the beam to systematically and repeatedly scan the ground below the aircraft, reflecting members arranged in pairs on the ground along the predetermined course for reflecting said beam to the aircraft when the beam falls thereupon, the members of each pair being disposed so that an imaginary line connecting the members of each pair lie substantially at right angles to the desired course of flight, the members of each pair being uniformly spaced apart across the predetermined course, and said pairs being substantially uniformly spaced along said predetermined course, the course and altitude of the aircraft being indicated thereby.

7. An aerial navigation system for enabling a pilot to fly an aircraft over a predetermined course comprising means on the aircraft for propagating a highly directional ultra high-frequency radio beam, means for causing the beam to systematically and repeatedly scan the ground below the aircraft, reflecting members substantially uniformly arranged on the ground along the predetermined desired course for reflecting said beam to the aircraft when it falls thereupon, an indicating screen in view of the pilot on the aircraft arranged to represent the portion of the ground being scanned by said radio beam, and means for producing image spots on said screen corresponding to the relative location of said reflecting members on the portion of the ground scanned by said radio beam, the relative position of the image spots being an indication of the course and altitude of the aircraft.

8. An aerial navigation system for enabling a pilot to fly an aircraft over a predetermined course comprising means on the aircraft for propagating a highly directional beam of energy, means for causing said beam to systematically and repeatedly scan the ground below and ahead of the aircraft, reflecting members arranged in pairs on the ground along the predetermined course for reflecting said beam to the aircraft when the beam falls thereupon, the members of each pair being disposed so that an imaginary line connecting the members of each pair lies substantially at right angles to the desired course of flight, said pairs being substantially uniformly spaced along said course and said members of each pair being substantially uniformly spaced apart, an indicating screen in view of the pilot on the aircraft arranged to represent the portion of the ground being scanned by said beam, and means for producing image spots on said screen corresponding to the relative location of said reflecting members on the portion of the ground being scanned by said radio beam, the relative spacing apart of the two spots of the pair resulting from a substantially vertical reflection being an indication of the altitude of the aircraft and the line of succeeding pairs of spots being an indication of the course of said aircraft.

9. An aerial navigation system for enabling a pilot to fly an aircraft over a predetermined course comprising means on the aircraft for propagating a highly directional beam of energy, means for causing said beam to systematically and repeatedly scan the ground below and ahead of the aircraft, reflecting members arranged in pairs on the ground along the predetermined course for reflecting said beam to the aircraft when said beam falls thereupon, and means responsive to the reflected beam for indicating the altitude, the heading and direction of motion of said aircraft with respect to said course.

10. A blind landing system comprising means on the aircraft for propagating a narrow highly directional ultra high-frequency radio beam, means for causing the beam to systematically and repeatedly scan the ground below the aircraft, a plurality of retro-reflectors disposed on the ground along two converging lines, an indicating screen in view of the pilot on the aircraft arranged to represent the portion of the ground being scanned by said radio beam, said screen having two transversely spaced indicating marks formed thereover, and means for producing image spots on said screen corresponding to the relative location of said retro-reflectors on the portion of the ground being scanned by said radio beam, whereby by flying said aircraft so that said image spots move over said indicating marks the aircraft is maintained on a desired glide-path as well as on a desired course.

11. A blind landing system comprising means on the aircraft for propagating a narrow highly directional ultra high-frequency radio beam, means for causing the beam to systematically and repeatedly scan the ground below the aircraft, a plurality of retro-reflectors disposed on the ground along two generally converging lines, the shape of the two lines and the rate at which they converge being determined by the desired glide path shape, an indicating screen in view of the pilot on the aircraft arranged to represent the portion of the ground being scanned by the radio beam, said screen having two parallel lines formed thereover, and means for producing image spots on said screen corresponding to the relative location of said retro-reflectors on the portion of the ground being scanned by said radio beam, the direction of extension of said indicating lines on said screen being parallel to the direction of motion of said image spots across said screen when the aircraft is on course, whereby by flying said aircraft so that said image spots move across said screen along and directly on said parallel lines the aircraft is maintained on a desired glide path as well as on a desired course.

12. A blind landing system comprising means on the aircraft for propagating a narrow highly directional ultra high-frequency radio beam, means for causing the beam to systematically and repeatedly scan the ground below the aircraft, a plurality of retro-reflectors disposed on the ground along two converging lines, at least one additional retro-reflector on the ground for indicating the point at which the plane is to be leveled off and set down on the ground, an indicating screen in view of the pilot on the aircraft arranged to represent the portion of the ground being scanned by said radio beam, said radio screen having two transversely spaced parallel indicating lines formed thereover, and means for producing image spots on said screen corresponding to the relative location of said retro-reflectors on the portion of the ground being scanned by said radio beam, whereby by flying said aircraft so that the image spots disposed along said two converging lines move over said screen directly along and on said parallel indicating lines the aircraft is maintained on a desired glide path as well as on a desired course and whereby the appearance of the additional image spots produced by said additional retro-reflectors indicate the time at which the aircraft in its glide is to be leveled off and set down on the landing area.

13. The combination comprising an ultra high-frequency radio transmitter, an antenna connected to the output of said transmitter, a group of generally parabolic reflectors, and means for successively positioning each of said reflectors behind said antenna.

14. The combination comprising an ultra high-frequency radio transmitter, an antenna connected to the output of said transmitter, a rotatable shaft, a plurality of metal reflectors each having the general shape of a paraboloid mounted on said shaft for rotation therewith, the individual axes of the paraboloids all lying in a single plane of rotation, said antenna being positioned and mounted on the circle of rotation of the respective focii of said paraboloidal reflectors, each of said reflectors having an opening in the back thereof to permit said antenna to pass into and out of the reflector as the shaft is rotated, and means for rapidly rotating said shaft.

HARRY C. MORGAN.